United States Patent
Sun et al.

(10) Patent No.: US 8,574,473 B2
(45) Date of Patent: Nov. 5, 2013

(54) FOAMED RESIN INJECTION MOLDING METHOD

(75) Inventors: Haoliang Michael Sun, Rochester Hills, MI (US); Ellen Cheng-chi Lee, Ann Arbor, MI (US); Junko Pauken, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 13/124,017

(22) PCT Filed: Aug. 5, 2010

(86) PCT No.: PCT/US2010/044563
§ 371 (c)(1), (2), (4) Date: Apr. 13, 2011

(87) PCT Pub. No.: WO2012/018338
PCT Pub. Date: Feb. 9, 2012

(65) Prior Publication Data
US 2012/0032365 A1 Feb. 9, 2012

(51) Int. Cl.
*B29C 44/02* (2006.01)
(52) U.S. Cl.
USPC ............. 264/45.3; 264/328.16; 425/4 R; 425/552
(58) Field of Classification Search
USPC ............. 264/45.3, 328.16; 425/4 R, 552
See application file for complete search history.

(56) References Cited

U.S. PATENT DOCUMENTS

| | | | |
|---|---|---|---|
| 3,687,582 A * | 8/1972 | Hendry et al. | 425/4 R |
| 3,962,154 A * | 6/1976 | Egli | 521/143 |
| 4,043,715 A * | 8/1977 | Hendry | 425/4 R |
| 4,201,742 A * | 5/1980 | Hendry | 264/45.5 |
| 4,390,332 A | 6/1983 | Hendry | |
| 4,390,485 A * | 6/1983 | Yang | 264/449 |
| 4,464,320 A * | 8/1984 | Saidla | 264/45.3 |
| 4,473,665 A | 9/1984 | Martini-Vvedensky et al. | |
| 4,496,131 A | 1/1985 | Yang | |
| 4,761,256 A | 8/1988 | Hardenbrook et al. | |
| 5,034,171 A | 7/1991 | Kiczek et al. | |
| 5,158,986 A | 10/1992 | Cha et al. | |
| 5,328,650 A * | 7/1994 | Ingram et al. | 264/45.3 |
| 5,512,601 A | 4/1996 | Halberstadt et al. | |
| 5,866,053 A | 2/1999 | Park et al. | |
| 5,912,278 A | 6/1999 | Venkataraman | |

(Continued)

FOREIGN PATENT DOCUMENTS

| | | |
|---|---|---|
| JP | 2005007589 | 1/2005 |
| KR | 100371334 B1 | 2/2003 |

(Continued)

OTHER PUBLICATIONS

International Search Report and Written Opinion of PCT/US2010/044563, 9 pages, dated May 27, 2011.

*Primary Examiner* — Jill Heitbrink
(74) *Attorney, Agent, or Firm* — Vichit Chea; Price Heneveld LLP (57) ABSTRACT

An injection molding apparatus and method are provided. The method includes a molded cavity coupled to a resin injection apparatus which injects molten resin under pressure with a gas such that the resin foams within the mold cavity. An electrical heater is in contact with a first cavity surface, and a cooling medium cools the mold. The resin may include metallic flakes.

11 Claims, 8 Drawing Sheets

(56) References Cited

U.S. PATENT DOCUMENTS

| | | |
|---|---|---|
| 6,005,041 A | 12/1999 | Cook |
| 6,165,396 A * | 12/2000 | Sato et al. .................. 264/45.3 |
| 6,328,916 B1 | 12/2001 | Nishikawa et al. |
| RE37,932 E | 12/2002 | Baldwin et al. |
| 6,544,024 B1 | 4/2003 | Yim |
| 6,673,994 B2 | 1/2004 | Broome et al. |
| 6,773,640 B2 | 8/2004 | Sugihara et al. |
| 6,811,730 B2 | 11/2004 | Gruber et al. |
| 6,884,823 B1 | 4/2005 | Pierick et al. |
| 6,926,940 B2 | 8/2005 | Ozaka et al. |
| 6,933,344 B2 | 8/2005 | Shah et al. |
| 7,001,549 B1 | 2/2006 | Stieler |
| 7,005,099 B2 | 2/2006 | Cecchin et al. |
| 7,100,941 B2 | 9/2006 | Riha et al. |
| 7,105,112 B2 | 9/2006 | Czaplicki et al. |
| 7,150,615 B2 | 12/2006 | Sugihara et al. |
| 7,172,333 B2 | 2/2007 | Anderson et al. |
| 7,294,295 B2 | 11/2007 | Sakamoto et al. |
| 7,318,713 B2 | 1/2008 | Xu et al. |
| 7,361,294 B2 | 4/2008 | Pierick et al. |
| 7,422,258 B2 | 9/2008 | Schindler et al. |
| 7,478,854 B2 | 1/2009 | Cowelchuk et al. |
| 7,540,989 B2 | 6/2009 | Kang |
| 7,585,439 B2 | 9/2009 | Branch et al. |
| 7,591,919 B2 | 9/2009 | Schindler et al. |
| 7,615,170 B2 | 11/2009 | Xu et al. |
| 7,670,539 B2 | 3/2010 | Kang |
| 7,740,473 B2 | 6/2010 | Kang |
| 2003/0141609 A1* | 7/2003 | Jia ...................................... 264/39 |
| 2004/0041303 A1* | 3/2004 | Kim et al. ..................... 264/320 |
| 2004/0102536 A1* | 5/2004 | Bollmann et al. ............. 521/155 |
| 2004/0115418 A1 | 6/2004 | Anderson et al. |
| 2004/0249009 A1 | 12/2004 | Homma et al. |
| 2004/0251570 A1 | 12/2004 | Sakamoto et al. |
| 2005/0285294 A1 | 12/2005 | Ozaka et al. |
| 2006/0063850 A1 | 3/2006 | Kanae et al. |
| 2007/0249742 A1* | 10/2007 | Howie et al. .................... 521/85 |
| 2008/0012166 A1 | 1/2008 | Miyachi et al. |
| 2008/0054529 A1* | 3/2008 | Kang ....................... 264/328.16 |
| 2009/0029143 A1 | 1/2009 | Kanae et al. |
| 2009/0042014 A1 | 2/2009 | Synnestvedt et al. |

FOREIGN PATENT DOCUMENTS

| | | |
|---|---|---|
| KR | 100465687 B1 | 1/2005 |
| KR | 200372094 Y1 | 1/2005 |
| KR | 1020060051600 A | 5/2006 |
| WO | WO2005094127 | 10/2005 |
| WO | WO2006136743 | 12/2006 |
| WO | WO2007031660 | 3/2007 |

* cited by examiner

FIG. 10 under pressure and the resin is injected into the mold cavity such that the drop in pressure triggers cell nucleation and foaming. The injection of resin with a gas in its supercritical state typically creates micron-sized voids in the thermoplastic polymer upon foam molding, and thus is also referred to as microcellular injection molding. Conventional microcellular injection techniques often produced molded parts that contain surface defects, such as swirls, splays, knit lines and flow lines due to gas diffusion. Hence, conventional techniques generally have limited applications to parts that do not have aesthetic appearance requirements.

FOAMED RESIN INJECTION MOLDING METHOD

FIELD OF THE INVENTION

The present invention generally relates to injection molding, and more particularly relates to a foamed resin injection molding apparatus and method of molding parts from a foamed resin.

BACKGROUND OF THE INVENTION

Foamed resin injection molding techniques typically employ a molten resin with dissolved gas injected into a mold cavity such that the resin foams in the mold cavity. The foaming of the resin is generally produced by using a gas that is provided in the resin under pressure and the resin is injected into the mold cavity such that the drop in pressure triggers cell nucleation and foaming. The injection of resin with a gas in its supercritical state typically creates micron-sized voids in the thermoplastic polymer upon foam molding, and thus is also referred to as microcellular injection molding. Conventional microcellular injection techniques often produced molded parts that contain surface defects, such as swirls, splays, knit lines and flow lines due to gas diffusion. Hence, conventional techniques generally have limited applications to parts that do not have aesthetic appearance requirements.

Accordingly, it is therefore desirable to provide for a microcellular injection molding apparatus and method that produces molded parts having good aesthetic appearances substantially free of unacceptable surface defects.

SUMMARY OF THE INVENTION

According to one aspect of the present invention, an injection molding apparatus is provided. The apparatus includes a first mold portion having a first cavity surface, and a second mold portion having a second cavity surface, wherein the first and second cavity surfaces define a cavity. The apparatus also includes a resin injection source for injecting a molten resin and gas into the cavity such that resin foams. The apparatus further includes an electric heater disposed in the second mold portion to heat the second cavity surface, and a cooling device to cool the cavity.

According to another aspect of the present invention, an injection molding apparatus is provided that includes a first mold portion having a first cavity surface, and a second mold portion having a second cavity surface, wherein the first and second cavity surfaces define a cavity. The apparatus also includes a resin injection source coupled to the cavity for injecting molten resin and gas into the cavity such that the resin foams, wherein the resin comprises metallic flakes. The apparatus further includes a heater disposed in thermal contact with the second cavity for heating the cavity, and a cooling device for cooling the cavity.

According to a further aspect of the present invention, a method for injection molding a part is provided. The method includes the steps of providing a mold cavity including a first mold portion having a first cavity surface and a second mold portion having a second cavity surface, wherein the first and second cavity surfaces define the mold cavity. The method also includes the step of providing a gas in a resin in a molten state. The method also includes the steps of heating the second mold portion with an electric heater to a temperature greater than 100° C., and injecting the molten state resin and gas at an elevated pressure into the cavity. The method further includes the steps of cooling the mold cavity and ejecting a solidified part from the mold cavity.

According to a further aspect of the present invention, a method for injection molding a part is provided. The method includes the steps of providing a mold cavity having a first mold portion having a first cavity surface, and a second mold portion having a second cavity surface, wherein the first and second cavity surfaces define the mold cavity. The method also includes the steps of providing a molten resin having metallic flakes, and providing a gas in the molten resin containing the metallic flakes. The method further comprises the steps of heating the second mold portion, cooling the mold cavity, and ejecting a solidified part from the mold cavity.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
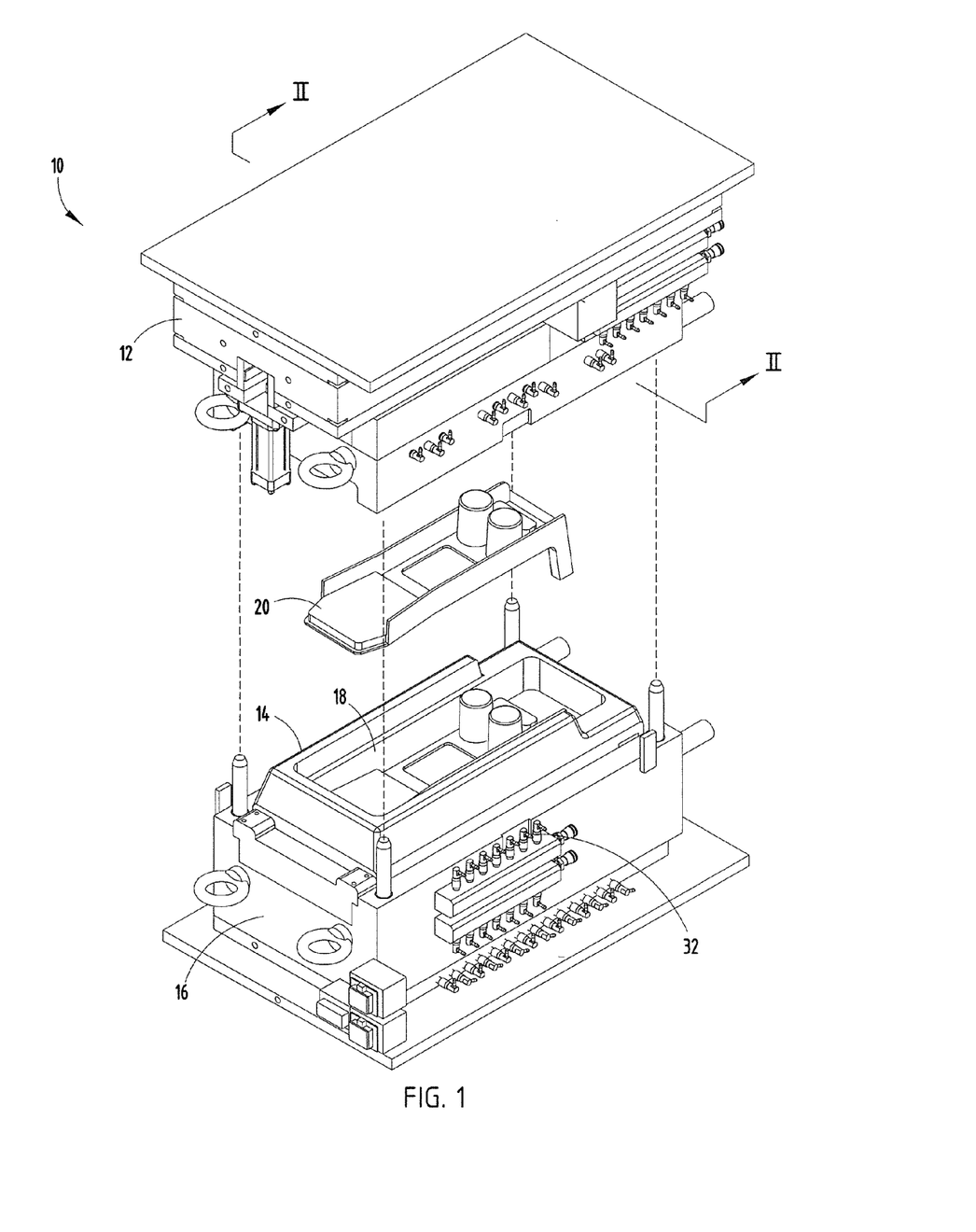
FIG. 1 is an exploded perspective view of a foamed resin injection molding apparatus, according to one embodiment.
Figure 2A:
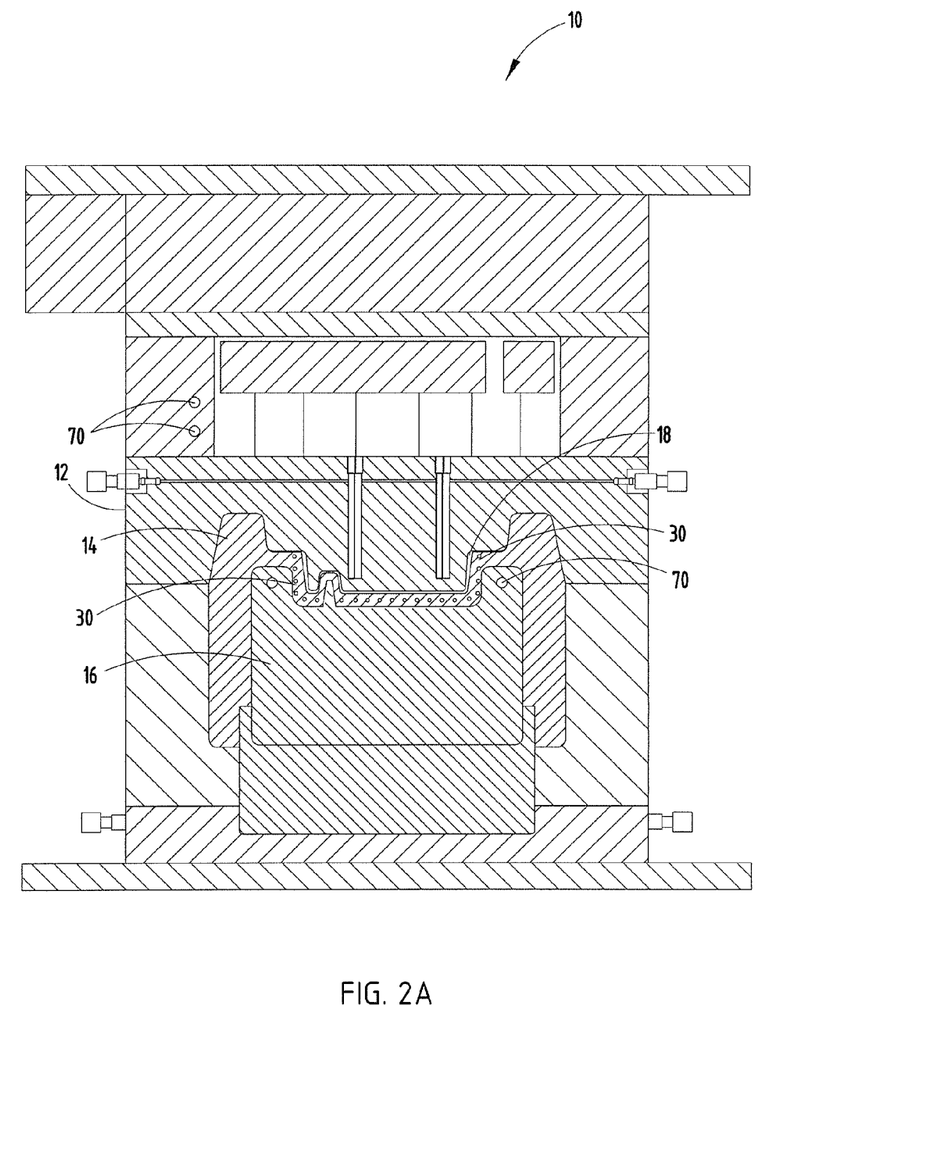
FIG. 2A is a cross-sectional view of the injection molding apparatus taken through line II-II of FIG. 1, with the molding apparatus closed and cooling applied.
Figure 2B:
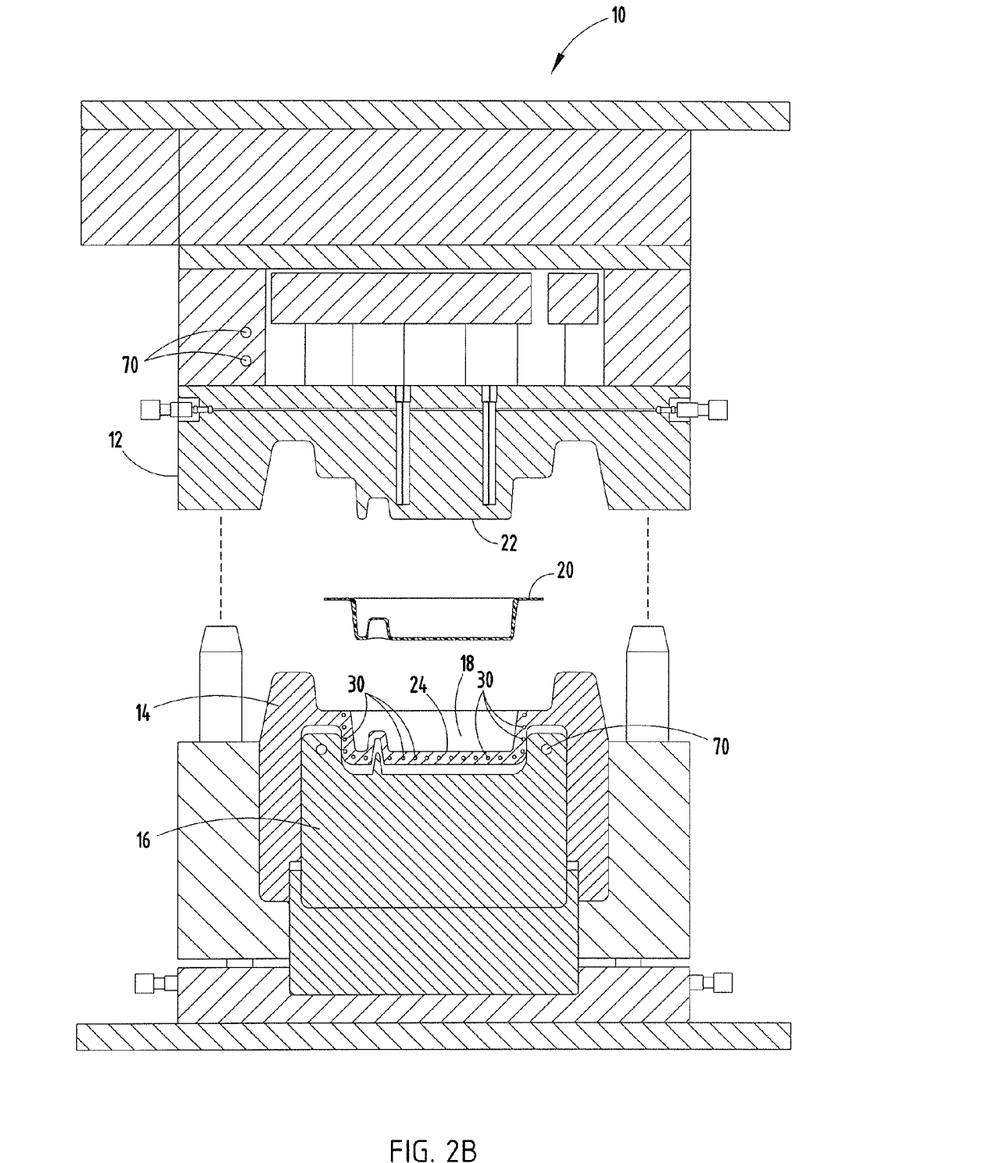
FIG. 2B is a cross-sectional view of the injection molding apparatus taken through line II-II of FIG. 1, with the molding apparatus open and the molded part ejected.

For purposes of description herein, the terms "upper," "lower," "right," "left," "rear," "front," "vertical," "horizontal," and derivatives thereof shall relate to the injection molding apparatus as oriented in FIGS. 1 and 2A-2B. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
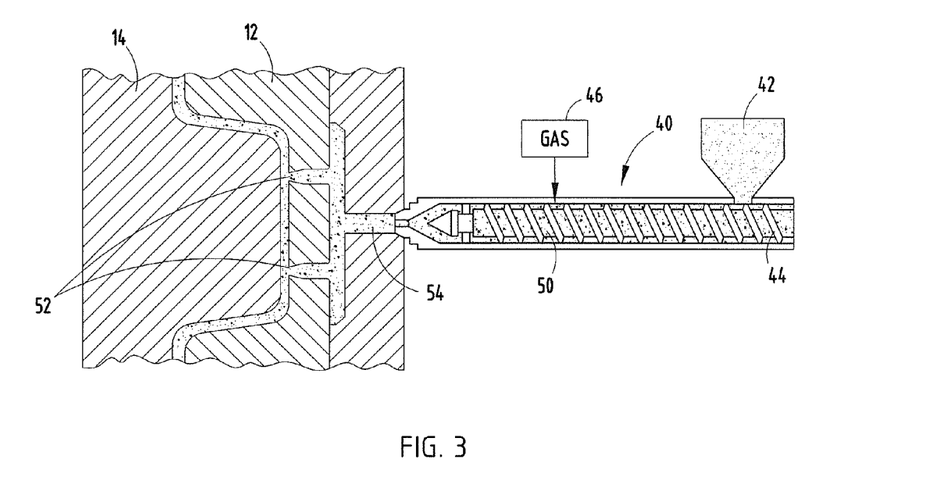
FIG. 3 is an enlarged sectional view of the resin injection source for injecting foamed resin into the mold cavity, according to one embodiment.

Referring now to FIGS. 1-3, a foamed resin injection molding apparatus or machine tool 10 is illustrated, according to one embodiment. The apparatus 10 includes a first mold portion 12 having a first cavity surface 22 and a second mold portion 14 having a second cavity surface 24. The first and second cavity surfaces 22 and 24 are matingly engageable to a closed position to define a mold cavity 18 in which a molded product or part 20 is formed during an injection molding process. The apparatus 10 also includes a resin injection source 40 coupled to the cavity 18 for injecting foamed resin 50 into the mold cavity 18. The resin 50 is in a molten state and is provided with a gas 46 and is under pressure and is heated as described herein. The apparatus 10 also includes an electric heater 30 having electric heating elements disposed in the second mold portion 14 and thermally coupled to the second cavity surface 24 which produces the aesthetically pleasing surface, also referred to as the A-surface, of the molded part 20. The apparatus 10 further includes a cooling device 16 coupled to the cavity 18 for cooling the molding apparatus, particularly the mold cavity. The electrical heater 30 and cooling device 16 are operated cyclically with the injection of foamed resin to form molded parts.

The first or upper mold portion 12 is shown movable into engagement and disengagement with the second or lower mold portion 14 as seen in FIGS. 2A-2B so as to allow for the formation of a molded part 20 in the closed cavity position shown in FIG. 2A and ejection of the molded part in the open position shown in FIG. 2B. In FIG. 2A, the injection molding apparatus 10 includes the upper first mold portion 12 closed against the lower second mold portion 14 so as to form a closed mold cavity 18. During the molding process, the electric heater 30 is activated to heat the lower cavity surface 24 to a temperature greater than 100° C., and more preferably to a temperature of at least 120° C., according to one embodiment, and a temperature of at least 130° C., according to a further embodiment. In one embodiment, the temperature of the lower cavity surface 24 is no greater than 230° C. The electric heater 30 is then turned off and the resin is then injected into the mold cavity 18 to fill the cavity and the resin foams. With the cavity 18 filled with foamed resin, cooling is initiated by moving the cooling plate 16 into contact with the lower mold portion 14 as is shown in FIG. 2A. The lower mold portion 14 includes a thermally conductive material, such as stainless steel according to one embodiment, such that the chilled effect from the cooling plate 16 quickly cools the lower cavity surface 24 and the molded component within mold cavity 18. According to one embodiment, the cooling plate 16 includes a plurality of cooling lines which may be fluid vessels 70 for passing a cooling liquid, such as chilled water, therethrough. It should further be appreciated that the cooling device 16 may also include one or more cooling vessels located in the upper mold portion 12 for cooling the first cavity surface 22. The cooling plate 16 is provided with a cooling medium in the range of 15° C. to 45° C. to expedite part solidification. In order to ensure a controlled temperature by way of the heating and cooling, the molding apparatus 10 includes a plurality of temperature sensors, in the form of thermocouples according to one embodiment, for sensing temperature at various locations around the mold cavity 18. The injection molding process may be controlled by control circuitry, such as the microprocessor, to achieve the desired temperature.

Once the molded part 20 is sufficiently cooled, the first mold portion 12 and second mold portion 14 are moved relative to each other to separate in the open position as shown in FIG. 2B so as to expose the mold cavity 18 and allow for ejection of the molded part 20. It should be appreciated that a hydraulic driven injector may be applied to facilitate the ejection of the molded part 20. Once the molded part 20 is ejected, the first and second mold portions 12 and 14 may be closed relative to each other and the injection molding process repeated. It should be appreciated that the injection molding process may be cyclically performed to produce one or more parts 20 at a rapid production rate.

Referring to FIG. 3, the resin injection source 40 is illustrated in fluid communication with the mold cavity 18 for injecting the foamed resin into the mold cavity 18. The foamed resin 50 is injected at an elevated pressure and at an elevated temperature such that the resin and gas mixture is in a molten one-phase state. The resin 50 may be supplied from a resin reservoir or hopper 42 and may include a thermoplastic polymer, such as molten polycarbonate (PC). The thermoplastic polymer may include PC/ABS, according to one embodiment, or may include molten PC/PBT, PC/PMMA, or ABS, according to other embodiments. It should be appreciated that other moldable thermoplastic materials may be employed as resin 50. The resin 50 is heated to a temperature to transition to its molten state and is injected and mixed with a gas to form a single-phase polymer-gas solution, according to one embodiment. The gas may include nitrogen according to one embodiment, or carbon dioxide according to another embodiment. The resin injection device 40 is shown employing a reciprocating screw 44 which draws the resin from resin reservoir 42 and creates a back pressure in the range of about 80 to 200 bar, according to one embodiment. The reciprocating screw 44 mixes the resin with the gas from gas supply 46, pressurizes the mixed gas and resin, and injects the mixed gas and resin into a resin port 54 which leads to gate ports 52 that enter mold cavity 18. In doing so, the resin experiences a rapid pressure drop when exiting the injection nozzle of resin injection source 40, which triggers cell nucleation, or foaming, as the foamed resin passes into the mold cavity 18. The controlled use of gas during the injection molding cycle in its supercritical state creates micron-sized voids in an otherwise solid resin material made up of thermoplastic polymer. The molded thermoplastic material centrally within the molded part 20 exhibits micron-sized voids, while the outer surface adjacent to the second mold surface 24 has a smooth class-A surface that is substantially free of defects, such as knit lines, springs, and swirls.

The foamed resin injection molding apparatus 10 has a resin injection source that injects a molten resin and a gas into the cavity such that the resin foams in the cavity. The gas may be added or injected into the resin, according to a first embodiment. According to a second embodiment, a chemical foaming process may be employed to achieve chemical foaming in which a chemical blowing agent is added as a polymer additive to the resin to generate gas, which in turn will cause foaming of the resin. The chemical blowing agent may decompose during the processing to liberate and trap gas within the resin. The chemical blowing agent may include Azodicarbonamide, according to one embodiment, or other known chemical blowing agents, such as 4,4-oxybis benzene sulfonyl hydrazide (OBSH), p-toluene sulfonyl hydrazide (TSH), 5-phenyltetrazole (5-PT), p-toluene sulfonyl semicarbazide (PTSS), di nitroso pentamethylene tetramine (DNPT), sodium bicarbonate (SBC), and zinc carbonate ($ZnCO_3$), according to other embodiments.

Figure 4:
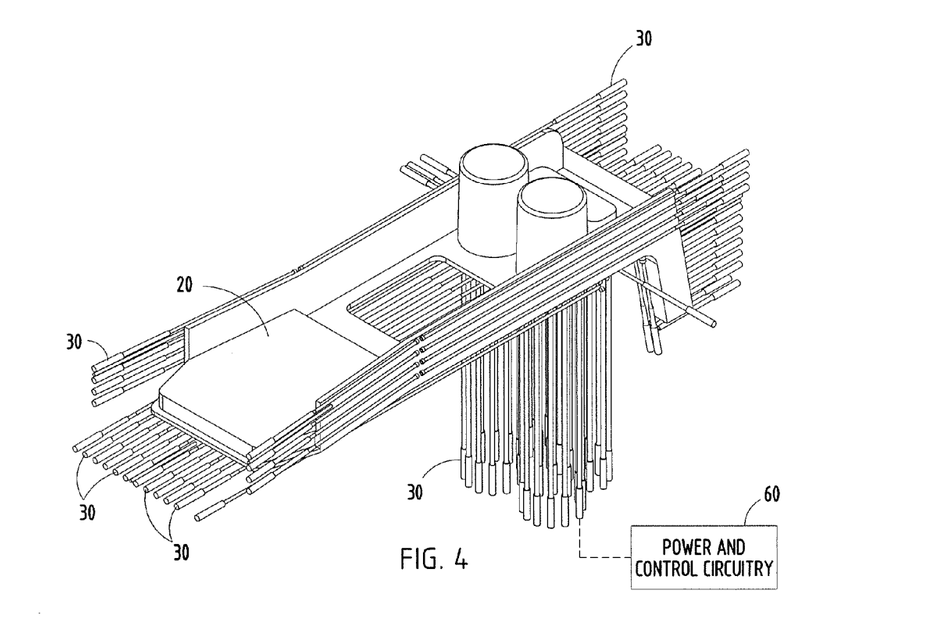
FIG. 4 is a perspective view of an electric heater having a plurality of heating elements which are located in the lower mold portion, according to one embodiment.
Figure 7:
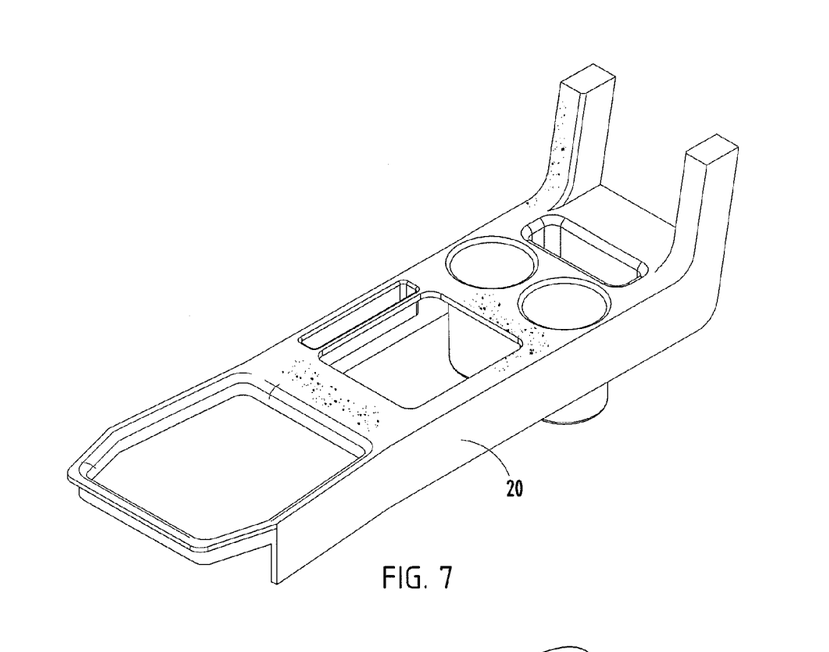
FIG. 7 is a perspective view of a molded part molded with the injection molding apparatus, according to one example.

Referring to FIG. 4, one example of an electric heater 30 with a configuration of heater elements is illustrated for forming a molded part 20, such as the part 20 shown in FIG. 7. In this embodiment, the heater elements 30 are shown extending in three orthogonal directions and are located in the lower mold portion 14 to provide heating at the lower mold cavity surface 24 near the lower surfaces of the molded part 20 to be formed. The heating elements 30 are located in the second mold portion 14 embedded within thermally conductive material, such as stainless steel, to heat the lower cavity surface forming the lower surface of the molded part 22, referred to as the A-surface, which is desirable of having an aesthetically pleasing appearance. The electric heater 30 may include flexible and/or rigid electrical resistance heating elements. The electric heater 30 is coupled to an electric power supply and is controlled by power and control circuitry 60, which may include a microprocessor or other control circuitry. The heater 30 is turned on and off to achieve a desired temperature at the lower second cavity surface 24, and may be controlled in response to temperatures sensed with one or more temperature sensors.

Figure 5:
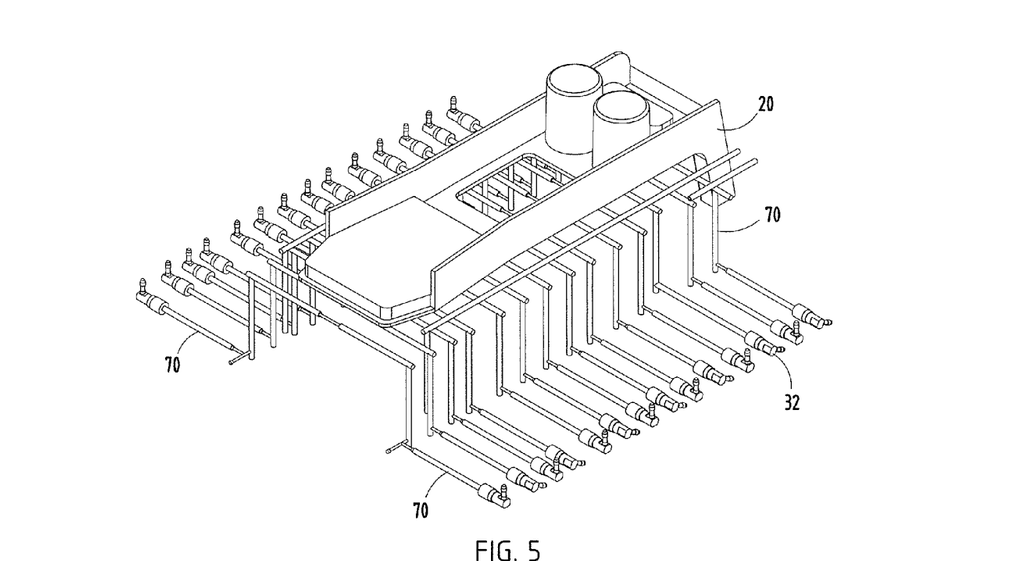
FIG. 5 is an assembly view of cooling vessels employed in the lower cooling plate, according to one embodiment.
Figure 6:
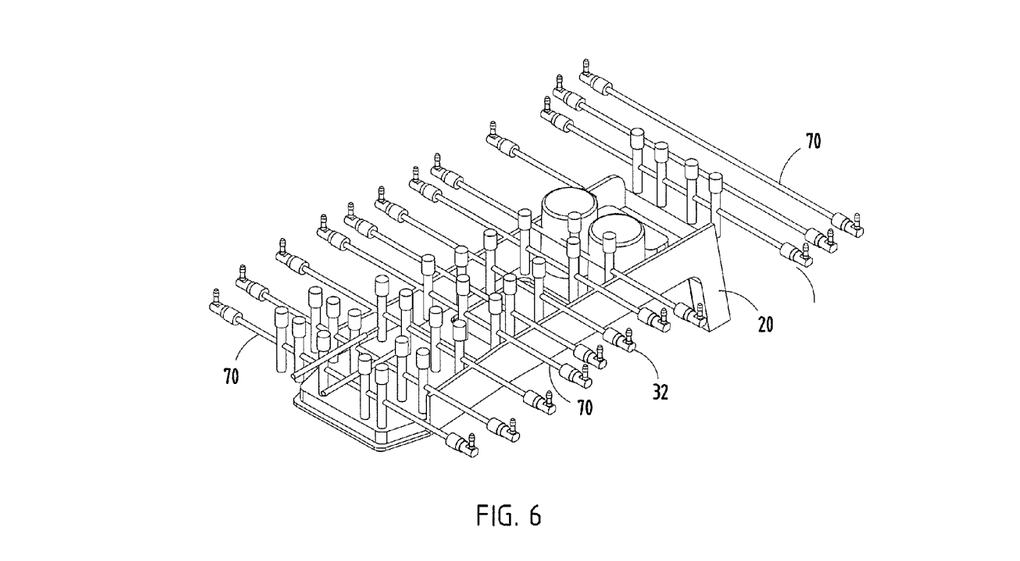
FIG. 6 is an assembly view of cooling vessels employed in the upper mold portion, according to one embodiment.

Referring to FIGS. 5 and 6, the cooling device 70 is illustrated, according to one embodiment. In the embodiment shown, the cooling device 70 employs a plurality of fluid (e.g., liquid) cooling lines in the form of vessels which are shown located below the molded part 20 within the cooling plate in FIG. 5, and located in the upper first mold above the molded part 20 in FIG. 6. According to one embodiment, the liquid cooling vessels 70 are located in the cooling plate 16 only. According to another embodiment, the cooling device may employ cooling vessels 70 in both the cooling plate 16 and the upper mold portion 12. The cooling vessels 70 provide sufficient cooling area within a cooling plate medium that is thermally conductive, such as aluminum material, so as to quickly transfer thermal energy to cool the mold cavity and the molded part. It should be appreciated that the fluid vessels 70 pass a coolant supply, such as chilled water, and may employ vessel connectors 32 and valves that are controlled by way of the controller 60 to achieve the desired cooling responsive to sensed temperatures.

An example of heating and cooling devices employed in conventional injection molding machines is disclosed in U.S. Pat. No. 7,740,473, the disclosure of which is hereby incorporated herein by reference. It should be appreciated that the injection molding apparatus 10 may employ a cooling and heating arrangement similar to that disclosed in U.S. Pat. No. 7,740,473, according to one embodiment.

Referring to FIG. 7, a molded part 20 is shown produced according to the foamed resin injection molding process in connection with the first embodiment. The molded part 20 is configured to a shape defined by the mold cavity 18 and includes an aesthetically pleasing substantially defect free upper surface shown in FIG. 7. The foamed resin injection molding process advantageously produces molded parts 20 that have a good surface quality substantially free of unacceptable surface defects such as swirls, splays, knit lines, and flow lines.

Figure 8:
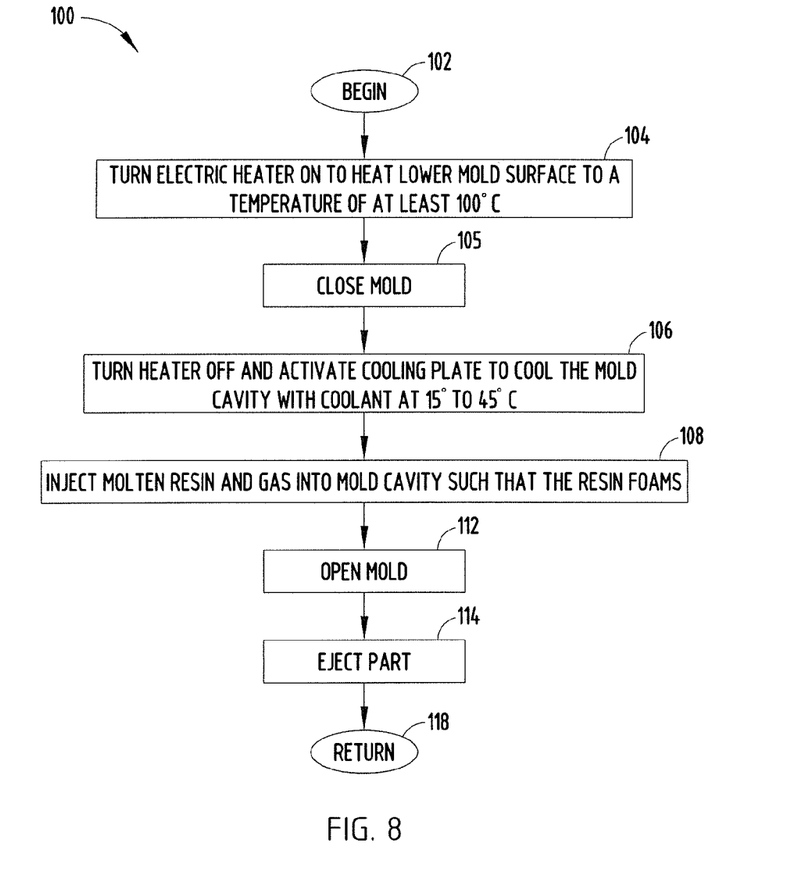
FIG. 8 is a flow diagram illustrating the steps of forming a molded part with the injection molding apparatus, according to a first embodiment.

The heating and cooling cycle for the injection molding process is illustrated by way of a method 100 of foamed resin injection molding of a part using this molding process as illustrated in FIG. 8, according to one embodiment. In this embodiment, the method 100 begins at step 102 and proceeds to step 104 to turn the electric heater on to heat the lower mold surface to a temperature of about at least 120° C. The mold is closed at step 105 and may close at the same time or before the heater is turned on. Next, the heater is turned off at step 106 and the cooling is activated such that coolant flows through the coolant vessels and the coolant plate is brought into contact with the lower mold portion 14 so as to cool the mold cavity with coolant at a temperature in the range of 15° C.-45° C., such as 30° C.-40° C., to solidify the resin. Next, molten resin and gas are injected into the mold cavity in step 108 such that the resin foams. As such, the temperature drops during the cooling process from above 120° C. to 45° C. or below.

Once the molded part is solidified, method 100 proceeds to step 112 to open the mold so as to expose the molded part, and ejects the part at step 114. Method 100 then returns at step 118 to repeat the process to form successive molded parts. The step 112 of opening the mold and step 104 of turning the heater on may occur at the same time and the part may be ejected once the mold is fully open.

According to a second embodiment, the foamed resin injection molding apparatus 10 is configured to inject a resin comprising metallic flakes into the mold cavity 18. The resin injection molding apparatus 10 includes the first mold portion 12 having the first cavity surface 22, and the second mold portion 14 having the second cavity surface 24. The first and second cavity surfaces 22 and 24 define the cavity 18. The apparatus also includes the resin injection source 40 coupled to the cavity 18 for injecting the resin and gas into the cavity 18, wherein the resin 50 comprises metallic flakes. The metallic flakes along with gas are provided in the resin which together are then injected into the mold cavity 18 such that the resin foams during the injection molding process. The apparatus further includes a heater disposed in thermal contact with the second cavity surface for heating the second cavity surface to a temperature above 120° C. and a cooling device coupled to the second cavity surface for cooling the cavity.

The metallic flakes give a metallic appearance to the molded part 20, which is desirable due to the aesthetic visual appeal for many goods in a variety of industries, such as automotive interior and exterior components, home appliance, sporting goods, and consumer electronics. The metallic flakes may be made of metal, such as aluminum, according to one embodiment. The flakes may remain solid in the molten polycarbonate resin. Thus, a metallic appearance, such as a chrome appearance, may be easily obtained on a polymeric injection molded part. The metallic flakes may have a size of 10 to 80 microns and the amount of flakes may include about 0.5 percent to 1.0 percent by weight of the resin. The resin may include ABS or a polycarbonate, such as the types discussed in connection with the first embodiment.

By including the metallic flakes in the moldable thermoplastic resin during the injection molding process, the molded part does not have to be painted to give the surface a metallic appearance, thus eliminating the need for paint. By employing the foamed resin in combination with the metallic flakes, the formation of lines can be eliminated at the flow front of the resin which may otherwise be caused by metallic flake orientation. According to this embodiment, the metallic appearance without paint is achieved by using the elevated tool cavity temperature and the foamed resin injection molding. The molding apparatus is heated to a temperature greater than 100° C., more preferably greater than 120° C., and in some embodiments, in the range of 150° C. to 170° C. The molding apparatus is cooled down on the cavity side of the injection molding tool, such that the cells or voids formed by the supercritical fluid coming out of solution disturbs the metallic flakes and randomizes their orientation to avoid flow marks and knit lines. The elevated tool cavity temperature enables the resin to flow and build along the tool surface, avoiding white flow marks, knit lines, and swirls on the part surface.

Figure 9:
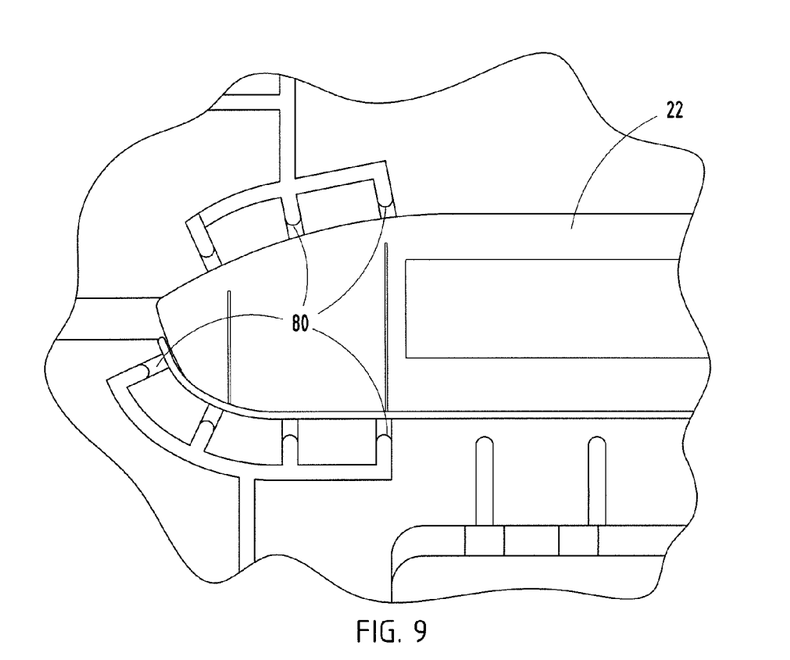
FIG. 9 is an enlarged front view of the cavity plate showing a plurality of vent locations, according to one embodiment.

Referring to FIG. 9, the upper cavity surface 22 of upper mold portion 12 is illustrated having a plurality of tool vents 80 at locations about the periphery of the mold cavity 18 and along flow fronts where the resin meets during injection, and at regions where gas may be trapped for venting fluid, such as air, during the injection molding process. It should be appreciated that a plurality of tool vents 80 may be located around the periphery of the tool to provide the desired appearance while eliminating white marks and haze. Additionally, the injection molding apparatus 10 employs gating at a location away from the visible area of the molded part, particularly away from the class-A surface. The gating may include a plurality of gates located away from the appearance surface. By locating the gates away from the class-A surface, surface defects that may be caused by the initial polymer from the gate are not as noticeable.

Figure 10:
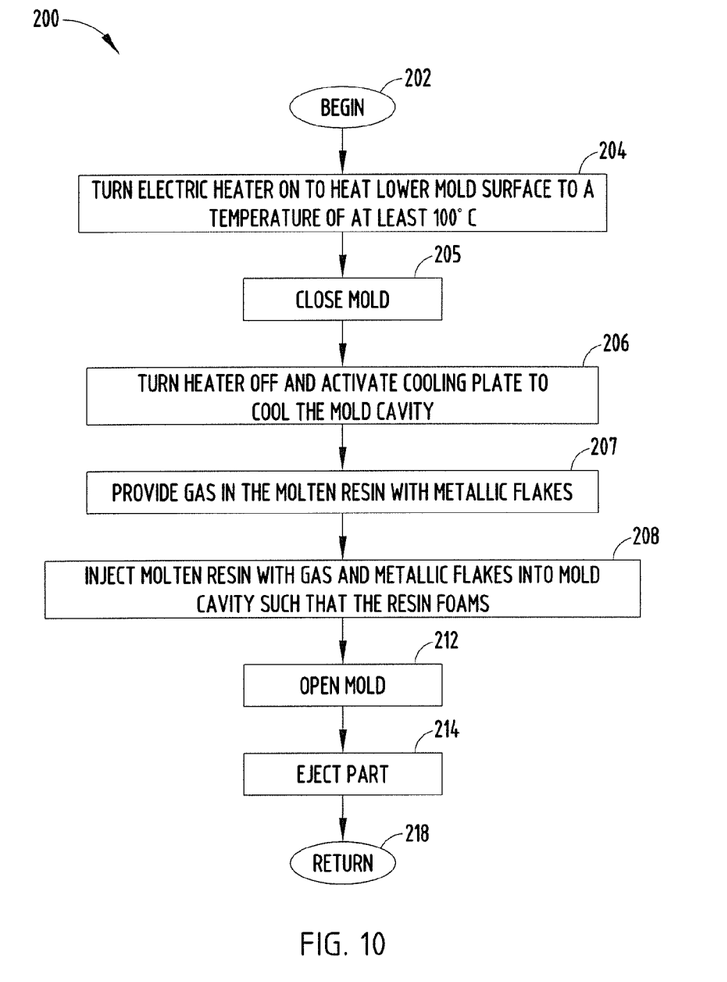
FIG. 10 is a flow diagram illustrating a process of forming a molded part, according to a second embodiment.

A method 200 for molding a polymeric part having a metallic appearance using the foam resin injection molding apparatus with metallic flakes according to the second embodiment, is illustrated in FIG. 10. The method 200 begins at step 202 and proceeds to step 204 to turn the electric heater on to heat the lower mold surface to a temperature of greater than 100° C. The mold is closed at step 205, which may occur at the same time or prior to turning the heater on. Once the lower mold surface reaches the desired temperature of at least greater than 100° C., the heater is turned off and the cooling plate and other cooling vessels are activated to cool the mold cavity to a desired low temperature, such as 45° C. or below at step 206. This may include applying the cooling plate in thermal contact with the lower mold portion and applying coolant to the upper mold portion. Next, molten resin containing metallic flakes is injected into the mold cavity at step 208 such that the resin foams. The molten resin/gas mixture with metallic flakes foams as it enters the cavity and randomizes the metallic flakes as they are dispersed throughout the mold cavity. Once the mold cavity is sufficiently cooled, the mold cavity is opened at step 212 and the molded part is ejected at step 214. The method 200 returns at step 218 and is repeated to cyclically produce molded parts having a metallic appearance.

According to a preferred embodiment, the injection molding apparatus 10 may form parts 20 using different temperature zones based on the geometry of the parts. In doing so, the injection molding apparatus 10 may selectively heat each of a plurality of zones of the mold cavity based on the geometry of each zone. As such, each zone may be formed at different temperatures.

Accordingly, the foamed resin injection molding apparatus 10 and method advantageously provides for good surface appearance molded parts using a foamed resin, avoids, or minimizes surface defects such as swirls, splays, knit lines, and flow lines due to gas diffusion. Additionally, the apparatus and method advantageously allows for the production of a metallic appearance molded part which controls the orientation of the metallic flakes so as to avoid or minimize witness lines formed in the part.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A method for injection molding a part comprising the steps of:
    providing a mold cavity including a first mold portion comprising a first cavity surface and a second mold portion comprising a second cavity surface, wherein the first and second cavity surfaces define the mold cavity;
    providing metallic flakes in a molten resin;
    injecting a gas into the molten resin in a molten state containing the metallic flakes, such that the gas disturbs the metallic flakes in the resin and randomizes orientation of metallic flakes;
    heating the second mold portion with an electric heater to a temperature greater than 100° C., wherein the electric heater heats different zones of the second cavity surface to different temperatures;
    injecting the molten state resin and gas at an elevated pressure into the cavity;
    cooling the mold cavity to form a solid part; and
    ejecting the solid part from the mold cavity, wherein the gas creates micron-sized voids within the solid part and an outer surface of the solid part is substantially free of defects.

2. The method as defined in claim 1, wherein the step of injecting a gas into the resin comprises injecting at least one of nitrogen and carbon dioxide as the gas into the resin.

3. The method as defined in claim 1 further comprising the step of venting fluid from a cavity at peripheral locations of the mold cavity and a flow front of resin during the injection molding process.

4. The method as defined in claim 1 further comprising the step of providing one or more gates located away from visible portions of the molded part.

5. A method for injection molding a part comprising the steps of:
    providing a mold cavity having a first mold portion comprising a first cavity surface, and a second mold portion comprising a second cavity surface, wherein the first and second cavity surfaces define the mold cavity;
    providing a molten resin having metallic flakes;
    injecting a gas into the molten resin containing the metallic flakes, wherein the gas coming out of solution disturbs the metallic flakes in the resin and randomizes the orientation of the metallic flakes;
    heating the second mold to a temperature above 100° C., wherein the electric heater heats different zones of the second cavity surface to different temperatures;
    cooling the mold cavity to form a solid part; and
    ejecting a solid part from the mold cavity, wherein the gas creates micron-sized voids within the solid part and an outer surface of the solid part is substantially free of defects.

6. The method as defined in claim 5, wherein the heating and cooling are operated cyclically with the injection of resin to form molded parts.

7. The method as defined in claim 5 further comprising the step of venting fluid at a periphery of the molded part and a flow front of the resin during the injection molding process.

8. The method as defined in claim 5 further comprising the step of injecting the resin at a plurality of gates located away from physical portions of the molded part.

9. The method as defined in claim 5, wherein the step of providing a gas comprises injecting at least one of nitrogen and carbon dioxide into the resin.

10. The method as defined in claim 5 further comprising the step of heating the second mold comprises heating the second mold to a temperature of at least 150° C.

11. The method as defined in claim 5, wherein the step of cooling comprises cooling the mold cavity with coolant at a temperature in the range of 15° C. to 45° C.

* * * * *